United States Patent
Kanbe et al.

(10) Patent No.: US 9,818,441 B2
(45) Date of Patent: Nov. 14, 2017

(54) THERMALLY ASSISTED MAGNETIC RECORDING MEDIUM AND MAGNETIC STORAGE DEVICE

(75) Inventors: Tetsuya Kanbe, Ichihara (JP); Atsushi Hashimoto, Ichihara (JP); Takayuki Fukushima, Ichihara (JP)

(73) Assignee: SHOWA DENKO K.K., Minato-ku, Tokyo (JP)

( * ) Notice: Subject to any disclaimer, the term of this patent is extended or adjusted under 35 U.S.C. 154(b) by 363 days.

(21) Appl. No.: 13/577,085

(22) PCT Filed: Feb. 3, 2011

(86) PCT No.: PCT/JP2011/052238
§ 371 (c)(1),
(2), (4) Date: Aug. 3, 2012

(87) PCT Pub. No.: WO2011/096472
PCT Pub. Date: Aug. 11, 2011

(65) Prior Publication Data
US 2012/0307398 A1 Dec. 6, 2012

(30) Foreign Application Priority Data
Feb. 4, 2010 (JP) .................. 2010-023414

(51) Int. Cl.
*G11B 5/73* (2006.01)
*G11B 5/65* (2006.01)
(Continued)

(52) U.S. Cl.
CPC ............. *G11B 5/7325* (2013.01); *G11B 5/65* (2013.01); *G11B 5/314* (2013.01); *G11B 2005/0005* (2013.01); *G11B 2005/0021* (2013.01)

(58) Field of Classification Search
CPC .. G11B 5/65; G11B 5/656; G11B 5/66; G11B 5/732; G11B 5/7325; G11B 5/738; G11B 2005/0021
See application file for complete search history.

(56) References Cited

U.S. PATENT DOCUMENTS

| 6,403,240 B1 | 6/2002 | Kanbe et al. |
| 7,289,298 B2 | 10/2007 | Maeda et al. |

(Continued)

FOREIGN PATENT DOCUMENTS

| CN | 1492398 A | 4/2004 |
| CN | 101627429 A | 1/2010 |

(Continued)

OTHER PUBLICATIONS

L10 FePt-oxide columnar perpendicular media with high coercivity and small grain size, Journal of Applied Physics, 2008, vol. 104, pp. 023904-1-023904-3.*

(Continued)

*Primary Examiner* — Holly Rickman
*Assistant Examiner* — Lisa Chau
(74) *Attorney, Agent, or Firm* — Sughrue Mion, PLLC

(57) ABSTRACT

Disclosed is a thermally assisted magnetic recording medium comprising a substrate, a plurality of underlayers formed on the substrate, and a magnetic layer which is formed on the underlayers and predominantly comprised of an alloy having a $L1_0$ structure, characterized in that at least one of the underlayers is predominantly comprised of MgO and comprises at least one oxide selected from $SiO_2$, $TiO_2$, $Cr_2O_3$, $Al_2O_3$, $Ta_2O_5$, $ZrO_2$, $Y_2O_3$, $CeO_2$, MnO, TiO and ZnO. The thermally assisted magnetic recording medium has a magnetic layer comprised of fine magnetic crystal grains, exhibiting a sufficiently weak exchange coupling between magnetic grains, and having a minimized coercive force dispersion.

10 Claims, 2 Drawing Sheets

(51) Int. Cl.
*G11B 5/31* (2006.01)
*G11B 5/00* (2006.01)

(56) References Cited

U.S. PATENT DOCUMENTS

| | | |
|---|---|---|
| 7,781,081 B2 | 8/2010 | Maeda et al. |
| 2004/0161638 A1* | 8/2004 | Maeda ............... G11B 5/65 428/832 |
| 2004/0229083 A1 | 11/2004 | Maeda et al. |
| 2005/0202287 A1* | 9/2005 | Lu ..................... G11B 5/65 428/831.2 |
| 2005/0214588 A1* | 9/2005 | Iwasaki ............ G11B 5/7325 428/831 |
| 2007/0048552 A1* | 3/2007 | Soeya ................ G11B 5/66 428/828 |
| 2007/0148500 A1 | 6/2007 | Maeda et al. |
| 2009/0136782 A1* | 5/2009 | Lu .............................. 428/828 |
| 2010/0136370 A1 | 6/2010 | Sakaguchi et al. |

FOREIGN PATENT DOCUMENTS

| | | |
|---|---|---|
| JP | 2001-134928 A | 5/2001 |
| JP | 2001-351226 A | 12/2001 |
| JP | 2004-303376 A | 10/2004 |
| JP | 2005-196813 A | 7/2005 |
| JP | 2006-236486 A | 9/2006 |
| JP | 2008-091024 A | 4/2008 |
| JP | 2009-158054 A | 7/2009 |
| WO | WO 2008030199 A1 * | 3/2008 |

OTHER PUBLICATIONS

Yang et al., "L10 FePt-oxide columnar perpendicular media with high coercivity and small grain size", Journal of Applied Physics, 2008, vol. 104, pp. 023904-1-023904-3.

Chen et al., "Development of L10 FePt:C (001) Thin Films With High Coercivity and Small Grain Size for Ultra-High-Density Magnetic Recording Media", Transactions on Magnetics, vol. 45, No. 2, Feb. 2009, pp. 839-844.

Japanese Office Action dated Dec. 6, 2013, issued in corresponding application No. 2010-023414.

Chinese Office Action issued in application No. 201180016253.2 dated Sep. 5, 2014.

* cited by examiner ns/inch² or larger. In
the case when the thermally assisted magnetic recording
system is adopted, even when a magnetic recording medium
having a coercive force of several tens kOe at room temperature is used, writing can easily be effected with a
magnetic head having the currently available magnetic
recording field.

Therefore a magnetic material exhibiting a high magneto
crystalline anisotropy Ku of higher than $10^6$ J/m³ can be
adopted for the recording layer. Thus, average particle
diameter of magnetic crystal grains can be reduced to 6 nm
or smaller while a high thermal stability is maintained. As
such high Ku material, there can be mentioned, for example,
a FePt alloy with an $L1_0$ type crystalline structure having an
approximately Ku of $7 \times 10^6$ J/m³ and a CoPt alloy with an
$L1_0$ type crystalline structure having an approximately Ku of
$5 \times 10^6$ J/m³.

In the case when a FePt alloy with an $L1_0$ type crystalline
structure is used for the magnetic layer, the FePt alloy crystal
grains in the layer must be (001)-ordered. It is preferable that
this magnetic FePt alloy layer with an $L1_0$ type crystalline
structure is formed on a (100)-orientated MgO-containing
underlayer. The (100) plane of MgO exhibits good lattice
constant conforming with the (001) plane of $L1_0$ type FePt
alloy. Therefore, when the magnetic FePt alloy layer with an
$L1_0$ type crystalline structure is formed on the (100)-orientated MgO-containing underlayer, the resulting magnetic
layer exhibits (001)-orientation.

To decrease a media noise and enhance an S/N ratio of the
magnetic recording medium, the particle diameters of magnetic crystal grains must be rendered fine even in the
thermally assisted magnetic recording medium. For this
purpose of rendering fine the magnetic crystal grains, it is
effective to incorporate an oxide such as $SiO_2$ or $TiO_2$ as a
grain boundary segregation material in the magnetic layer.
That is, FePt crystal grains can be of a granular structure
such that the crystal grains are surrounded by the added
oxide such as $SiO_2$.

The particle diameters of magnetic crystal grains can be
rendered fine by adding an increased amount of the grain
boundary segregation material. For example, it is described
in J. Appl. Phys. 104, 023904, 2008 that the particle diameters of FePt alloy magnetic crystal grains can be reduced to
5 nm by adding 20 volume % of $TiO_2$. Further, it is described
in IEEE. Trans. Magn., vol. 45, 839, 2009 that the particle diameters of FePt alloy magnetic crystal grains can be
reduced to 2.9 nm by adding 50 volume % of $SiO_2$.

SUMMARY OF THE INVENTION

Problems to be Solved by the Invention

The magnetic layer of a thermally assisted magnetic
recording medium is preferably formed from, for example,
a FePt alloy with an $L1_0$ structure having a high Ku. To
obtain a thermally assisted magnetic recording medium
having a high S/N ratio, magnetic crystal grains for the
magnetic layer must be rendered fine and simultaneously
exchange coupling between magnetic crystal grains must be
sufficiently reduced. To obtain a high S/N ratio, it is effective
to incorporate a grain boundary segregation material such as
$SiO_2$ or carbon in the magnetic layer. To render the crystal
grains for the magnetic layer fine to a size of approximately
6 nm or smaller, and simultaneously reduce the exchange
coupling between magnetic grains to the desired extent, the
amount of the grain boundary segregation material must be
30 to 40 volume % or larger.

However, the incorporation of a large amount of the grain
boundary segregation material invites reduction in regularity
of FePt alloy crystal having an $L1_0$ structure, with the
reduction of Ku. Therefore, it is eagerly desired to render
crystal grains for the magnetic layer fine and efficiently
reduce the exchange coupling between magnetic grains,
while a high regularity of the $L1_0$-FePt alloy crystal is kept.

Further, the incorporation of a large amount of the grain
boundary segregation material invites a great increase in
dispersion of the coercive force. The increase in dispersion
of the coercive force is presumed to be due to increases in
dispersion of the grain diameters and in dispersion of the
grain boundary width. Therefore, it is also important to
obtain a medium with a high S/N ratio while the increase in
dispersion of the coercive force is avoided.

In view of the foregoing background art, a primary object
of the present invention is to provide a thermally assisted
magnetic recording medium characterized as having a magnetic layer comprised of fine magnetic crystal grains with a
minimized diameter dispersion, exhibiting a sufficiently
weak exchange coupling between magnetic grains, and
having a minimized coercive force dispersion.

Another object of the present invention is to provide a
magnetic recording storage device which is provided with a
thermally assisted magnetic recording medium having the
above-mentioned benefits, and exhibits improved magnetic
recording properties such as a high S/N ratio and good
overwriting characteristics.

Problems to be Solved by the Invention

In accordance with the present invention, there are provided the following thermally assisted magnetic recording
mediums and magnetic recording storage device.

(1) A thermally assisted magnetic recording medium
comprising a substrate, a plurality of underlayers formed on
the substrate, and a magnetic layer which is formed on the
underlayers and predominantly comprised of an alloy having
a $L1_0$ structure, characterized in that at least one of said
underlayers is predominantly comprised of MgO and comprises at least one oxide selected from the group consisting
of $SiO_2$, $TiO_2$, $Cr_2O_3$, $Al_2O_3$, $Ta_2O_5$, $ZrO_2$, $Y_2O_3$, $CeO_2$,
MnO, TiO and ZnO.

(2) The thermally assisted magnetic recording medium as
mentioned above in (1), wherein the content of the oxide or oxides contained in the underlayer predominantly comprised of MgO is in the range of 2 mol % to 40 mol %, based on the underlayer predominantly comprised of MgO.

(3) The thermally assisted magnetic recording medium as mentioned above in (1) or (2), wherein the underlayer predominantly comprised of MgO is formed on an underlayer which is comprised of Cr, or a Cr alloy predominantly comprised of Cr and having a BCC structure.

(4) The thermally assisted magnetic recording medium as mentioned above in (1) or (2), wherein the underlayer predominantly comprised of MgO is formed on an underlayer comprised of Ta.

(5) The thermally assisted magnetic recording medium as mentioned above in any one of (1) to (4), wherein the underlayer predominantly comprised of MgO has an average particle diameter of not larger than 10 nm.

(6) The thermally assisted magnetic recording medium as mentioned above in anyone of (1) to (5), wherein the magnetic layer is predominantly comprised of a FePt or CoPt alloy having a $L1_0$ structure, and comprises at least one oxide or element, selected from the group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO and carbon.

(7) The thermally assisted magnetic recording medium as mentioned above in (6), wherein the content of said oxide or oxides in the magnetic layer is in the range of 10 mol % to 40 mol %, based on the magnetic layer.

(8) The thermally assisted magnetic recording medium as mentioned above in (6), wherein the content of carbon in the magnetic layer is in the range of 10 atomic % to 70 atomic %, based on the magnetic layer.

(9) A magnetic recording storage device comprising, in combination:
a magnetic recording medium;
a driving part for rotating the magnetic recording medium;
a magnetic head comprising a laser emitting means for heating the magnetic recording medium, a waveguide for guiding laser from the laser-emitting means to a tip of the magnetic head, and an evanescent light-emitting means provided at the tip of the magnetic head part;
means for moving the magnetic head; and
a recording-and-reproducing signal treating means;
wherein the magnetic recording medium is characterized as being a thermally assisted magnetic recording medium as mentioned above in any one of (1) to (8).

Effect of the Invention

The thermally assisted magnetic recording medium of the present invention has a magnetic layer characterized as being comprised of fine magnetic crystal grains with a minimized diameter dispersion, exhibiting a sufficiently weak exchange coupling between magnetic grains, and having a minimized coercive force dispersion. Therefore, a magnetic recording storage device provided with the thermally assisted magnetic recording medium having the above-mentioned benefits exhibits improved magnetic recording properties such as a high S/N ratio and good overwriting characteristics.

LIST OF REFERENCE NUMERALS

Figure 1:
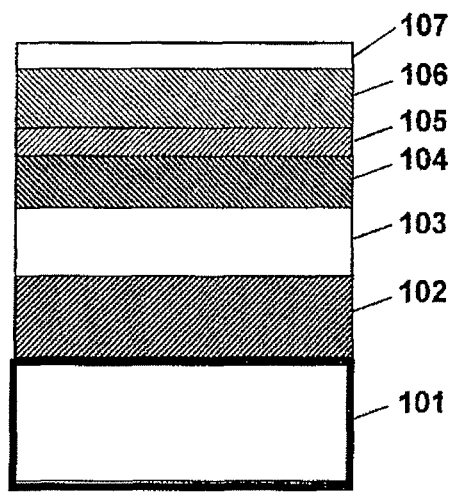
FIG. 1 is an enlarged sectional view illustrating an example of the multilayer structure of the thermally assisted magnetic recording medium of the present invention.

101: Glass substrate
102: NiTi underlayer
103: Soft magnetic underlayer
104: Cr underlayer
105: Layer predominantly comprised of MgO
106: Magnetic layer
107: Carbon overcoat
201: Glass substrate
202: NiTa underlayer
203: Soft magnetic underlayer
204: Ta underlayer
205: Layer predominantly comprised of MgO
206: Magnetic layer
207: Carbon overcoat
701: Magnetic recording medium
702: Driving part for magnetic recording medium
703: Magnetic head
704: Means for moving magnetic head
705: Recording-and-reproducing signal treating means
801: Recording head part
802: Upper magnetic pole
803: Lower magnetic pole
804: PSIM (Planar solid immersion mirror)
805: Evanescent light-emitting means
806: Grating part of PSIM
807: Laser-emitting means
808: Semi-conductor laser
809: Evanescent light
810: Medium
811: Reproducing head part
812: Upper shield
813: Lower shield
814: TMR element

MODES FOR CARRYING OUT THE INVENTION

The thermally assisted magnetic recording medium according to the present invention and the magnetic recording storage device provided with the magnetic recording medium will be described in detail with reference to the accompanying drawings. The drawings are made in a fashion such that, when appropriate, some parts or portions are drawn in a large scale and the scales of dimension of all parts are altered from the actual scales so that the features of the invention can easily be understood.

The thermally assisted magnetic recording medium according to the present invention comprising a substrate, a plurality of underlayers formed on the substrate, and a magnetic layer which is formed on the underlayers and predominantly comprised of an alloy having a $L1_0$ structure, is characterized in that at least one of said underlayers is predominantly comprised of MgO and comprises at least one oxide selected from the group consisting of $SiO_2$, $TiO_2$, $Cr_2O_3$, $Al_2O_3$, $Ta_2O_5$, $ZrO_2$, $Y_2O_3$, $CeO_2$, MnO, TiO and ZnO.

If a magnetic layer comprised of a plurality of magnetic crystal grains is formed on an underlayer comprised of magnetic particles so that a plurality of magnetic crystal grains are located on one large MgO particle in the MgO underlayer, the exchange coupling between magnetic crystal grains cannot be lowered sufficiently to the desired extent. In contrast, if the size of MgO particles in the MgO underlayer is rendered fine, "one-by-one growth" of the magnetic crystal grains, i.e., growth of one particle of the magnetic crystal grains on one MgO crystal particle, can be promoted. This one-by-one growth enhances discretion of magnetic crystal grains in the magnetic layer and desirably lowers the exchange coupling. Further, the one-by-one growth renders uniform the particle diameters of magnetic crystal grains, which results in the reduction of the coercive force dispersion.

The size of MgO particles in the MgO underlayer can be rendered fine by incorporating an oxide selected from the group consisting of $SiO_2$, $TiO_2$, $Cr_2O_3$, $Al_2O_3$, $Ta_2O_5$, $ZrO_2$, $Y_2O_3$, $CeO_2$, MnO, TiO and ZnO.

To enhance the discretion of magnetic crystal grains in the magnetic layer, the particles in the MgO-containing underlayer are preferably rendered fine so that an average particle diameter is not larger than approximately 10 nm. However, to realize a plane recording density of approximately 1 Tbit/inch$^2$ or more, the average particle diameter of the magnetic crystal grains should be approximately 6 nm or smaller. For these small particle diameters of the magnetic crystal grains, the average particle diameter in the MgO-containing underlayer should also be approximately 6 nm or smaller.

The amount of the oxide or oxides incorporated in the MgO-containing underlayer is not particularly limited, provided that the NaCl structure and (100)-orientation in the MgO underlayer are not greatly deteriorated. But, the amount of the oxide or oxides incorporated in the MgO underlayer is preferably in the range of 2 mol % to 40 mol % based on the MgO underlayer. When the amount of oxide is smaller than 2 mol %, MgO particles cannot be rendered fine to the desired extent. In contrast, when the amount of oxide is larger than 40 mol %, the NaCl structure of the MgO underlayer is deteriorated.

The magnetic layer is preferably comprised of an alloy such as FePt alloy or CoPt alloy, which has an $L1_0$ structure.

Grain boundary segregation material can be incorporated in the FePt alloy or CoPt alloy. As examples of the grain boundary segregation material, there can be mentioned oxides selected from $SiO_2$, $TiO_2$, $Cr_2O_3$, $Al_2O_3$, $Ta_2O_5$, $ZrO_2$, $Y_2O_3$, $CeO_2$, MnO, TiO and ZnO, and carbon. These oxides and carbon may be used either alone or in combination.

When the grain boundary segregation material is incorporated in the FePt or CoPt alloy layer having an $L1_0$ structure, the magnetic layer has a granular structure wherein the magnetic crystal grains are separated by the grain boundary segregation material.

The amount of the grain boundary segregation material to be incorporated in the magnetic layer is preferably at least 30% by volume based on the total volume of the magnetic layer. To render magnetic crystal grains discrete to more desired extent, the grain boundary segregation material is used preferably in an amount of at least 40% by volume. However, if the amount of the grain boundary segregation material is too much, the $L1_0$ structure tends to be deteriorated, and therefore, the amount of the grain boundary segregation material is preferably not larger than 60% by volume.

The volume per mole % of the above-mentioned oxides for the grain boundary segregation material varies depending upon the particular kind of material. Therefore, the amount in mol % of the oxides used should be chosen so that the above-mentioned volume % can be obtained. For example, when $SiO_2$ is used as the grain boundary segregation material, its amount is preferably in the range of approximately 10% by mol to approximately 30% by mol based on the total magnetic layer. For the other oxides, their amounts are preferably in the range of approximately 10% by mol to approximately 40% by mol, based on the total magnetic layer.

When carbon is used as the boundary segregation material, its amount is preferably in the range of approximately 10 atomic % to approximately 70 atomic % based on the total magnetic layer.

By the incorporation of the boundary segregation material, crystal grain diameter of the FePt alloy or CoPt alloy can be rendered 6 nm or smaller and simultaneously the grain boundary width can be 1 nm or larger, with the result of reduction in the exchange coupling between the magnetic crystal grains.

The underlayer predominantly comprised of MgO is preferably (100)-orientated so that the FePt or CoPt alloy with an $L1_0$ structure be (001)-orientated. The (100)-orientated MgO-containing underlayer can be realized, for example, by forming a Ta underlayer on a glass substrate, and then, forming the underlayer predominantly comprised of MgO on the Ta underlayer.

In the case when an underlayer comprised of Cr, or a Cr alloy predominantly comprised of Cr and having a BCC structure is formed on a heated glass substrate, the formed Cr or Cr alloy underlayer is (100)-orientated. A MgO-containing layer formed on the Cr or Cr alloy underlayer can also be (100)-orientated. The Cr alloy used includes, for example, CrTi, CrMo, CrV, CrW, CrMo, CrRu and CrMn.

In the thermally assisted magnetic recording medium according to the present invention, which has a plurality of underlayers formed on the substrate, it is essential that at least one of the underlayers is comprised of MgO and comprises at least one specific oxide. The other underlayers are not particularly limited and can be conventional underlayers widely used in general magnetic recording mediums.

As specific examples of the underlayers other than the underlayer predominantly comprised of MgO and comprising the specific oxide, there can be mentioned the above-mentioned orientation-controlling layer comprised of Ta; the above-mentioned underlayer comprised of Cr, or a Cr alloy predominantly comprised of Cr and having a BCC structure; a heat sink layer comprised of metal having a high thermal conductivity such as Cu, Ag, Al or alloys predominantly comprised of these metals; and soft magnetic underlayer comprised of Cr or a Cr alloy provided for improving write characteristics; and an adhesion layer for enhancing adhesion between a substrate and other layers.

EXAMPLES

The present invention will now be specifically described by the following examples. The examples should not limit the scope of the invention. The invention can also be practiced in accordance with embodiments modified from the examples within the scope of the invention.

Examples 1-1 to 1-14, and Comparative Example 1

Thermally assisted magnetic recording mediums having a multilayer structure as illustrated in FIG. 1 were manufactured as follows.

A Ni-50 atomic % Ti alloy underlayer (102) having a thickness of 30 nm was formed on a heat-resistant glass substrate (101). Then a soft magnetic underlayer (103) having a thickness of 25 nm comprised of Co-20 atomic % Ta-5 atomic % B alloy was formed on the Ni—Ti alloy underlayer-formed substrate. Then the soft magnetic underlayer-formed substrate was heated to 250° C., and a Cr layer (104) having a thickness of 10 nm was formed thereon. Then an underlayer (105) predominantly comprised of MgO and having a thickness of 5 nm was formed, and then the substrate was heated to 420° C. Thereafter, (Fe-55 atomic % Pt)-18 mol % $TiO_2$ magnetic layer (106) having a thickness of 6 nm and then a carbon protective overcoat (107) having a thickness of 3 nm were formed in this order.

As the underlayer (104) predominantly comprised of MgO, each of the following compositions was adopted.

MgO-10 mol % $SiO_2$ (Example 1-1)
MgO-2 mol % $TiO_2$ (Example 1-2)
MgO-5 mol % $SiO_2$-5 mol % $TiO_2$ (Example 1-3)
MgO-8 mol % $Cr_2O_3$ (Example 1-4)
MgO-5 mol % $Al_2O_2$ (Example 1-5)
MgO-2 mol % $Ta_2O_5$ (Example 1-6)
MgO-5 mol % $SiO_2$-5 mol % $Ta_2O_5$ (Example 1-7)
MgO-15 mol % $ZrO_2$ (Example 1-8)
MgO-10 mol % $Y_2O_2$ (Example 1-9)
MgO-10 mol % $Y_2O_2$-10 mol % TiO (Example 1-10)
MgO-5 mol % $CeO_2$ (Example 1-11)
MgO-12 mol % MnO (Example 1-12)
MgO-20 mol % TiO (Example 1-13)
MgO-15 mol % ZnO (Example 1-14)

For comparison, an MgO underlayer to which an oxide had not been added was used in Comparative Example 1.

Each of the magnetic recording mediums manufactured in Examples 1-1 to 1-14 and Comparative Example 1 was analyzed by X-ray diffractometry. A strong BCC (200) peak attributed to the Cr underlayer was observed. A strong diffraction peak attributed to $L1_0$-FePt (001) in the magnetic layer was observed. Further, a mixed peak of $L1_0$-FePt (002) peak with FCC—FePt (200) peak was observed in the magnetic layer. Integral intensity ratio of the former $L1_0$-FePt (001) peak to the latter mixed peak of $L1_0$-FePt (002) with FCC—FePt (200) was in the range of 1.6 to 1.8. This shows that $L1_0$ type FePt alloy crystal having a high regularity was formed.

The coercive force Hc and the dispersion of coercive force ΔHc/Hc of the magnetic recording mediums of the examples according to the invention and those of the comparative example were measured. The results are shown in Table 1.

Measurement of the dispersion of coercive force ΔHc/Hc was conducted by the method described in IEEE Trans. Magn., vol. 27, pp 4975-4977, 1991, at room temperature. More specifically, magnetic fields were measured when the magnetization reached 50% of the saturated value in the major loop and the minor loop. The ΔHc/Hc was calculated from the difference between the two magnetic fields on the presumption that the distribution of Hc shows Gauss distribution.

The ΔHc/Hc of the magnetic recording mediums of the examples was not larger than 0.3, but the ΔHc/Hc of the comparative example was 0.52, i.e., far larger than those of the examples. Thus, it is seen that the ΔHc/Hc can be decreased to the desired extent by incorporating in the MgO underlayer an oxide such as $SiO_2$.

The above-mentioned procedures were repeated wherein a magnetic layer was made from each of FePt—$SiO_2$, FePt—$Cr_2O_3$, FePt—$Al_2O_3$, FePt—$Ta_2O_5$, FePt—$ZrO_2$, FePt—$Y_2O_3$, FePt—$CeO_2$, FePt—MnO, FePt—TiO and FePt—ZnO, instead of FePt—$TiO_2$, with all other conditions remaining the same. The dispersion of coercive force of the magnetic recording mediums could also be reduced by formation of the MgO underlayer having a specific oxide incorporated therein.

The above-mentioned procedures were repeated wherein a magnetic layer was made from a mixture of a CoPt alloy having a $L1_0$ structure, instead of the FePt alloy, with each of the above-mentioned oxides, with all other conditions remaining the same. The dispersion of coercive force of the magnetic recording mediums could also be reduced by formation of the MgO underlayer having a specific oxide incorporated therein.

The above-mentioned procedures were repeated wherein a magnetic layer was made from a mixture of the FePt or CoPt alloy with carbon instead of the above-mentioned oxides, with all other conditions remaining the same. The dispersion of coercive force of the magnetic recording mediums could also be reduced by formation of the MgO underlayer having a specific oxide incorporated therein.

TABLE 1

| Examples | Composition of underlayer | Hc (kOe) | Δ Hc/Hc |
|---|---|---|---|
| Ex. 1-1 | MgO—10 mol % $SiO_2$ | 14.2 | 0.25 |
| Ex. 1-2 | MgO—2 mol % $TiO_2$ | 15.6 | 0.29 |
| Ex. 1-3 | MgO—5 mol % $SiO_2$—5 mol % $TiO_2$ | 14.2 | 0.21 |
| Ex. 1-4 | MgO—8 mol % $Cr_2O_3$ | 13.8 | 0.23 |
| Ex. 1-5 | MgO—5 mol % $Al_2O_3$ | 13.9 | 0.26 |
| Ex. 1-6 | MgO—2 mol % $Ta_2O_5$ | 15.2 | 0.28 |
| Ex. 1-7 | MgO—5 mol % $SiO_2$—5 mol % $Ta_2O_5$ | 14.9 | 0.23 |
| Ex. 1-8 | MgO—15 mol % $ZrO_2$ | 15.7 | 0.22 |
| Ex. 1-9 | MgO—10 mol % $Y_2O_3$ | 16.1 | 0.28 |
| Ex. 1-10 | MgO—10 mol % $Y_2O_3$—10 mol % TiO | 15.5 | 0.29 |
| Ex. 1-11 | MgO—5 mol % $CeO_2$ | 16.1 | 0.25 |
| Ex. 1-12 | MgO—12 mol % MnO | 15.5 | 0.26 |
| Ex. 1-13 | MgO—20 mol % TiO | 15.1 | 0.25 |
| Ex. 1-14 | MgO—15 mol % ZnO | 14.4 | 0.23 |
| Com. Ex. 1 | MgO | 15.6 | 0.52 |

Examples 2-1 to 2-8

Figure 2:
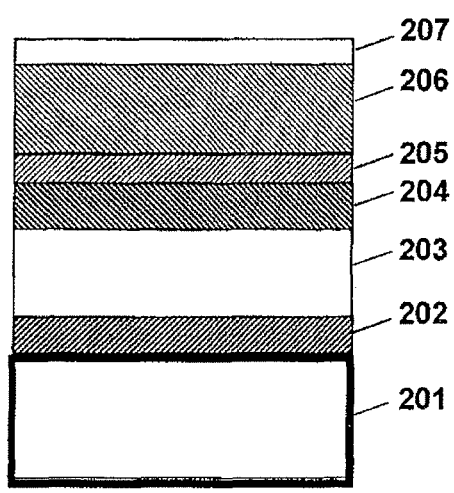
FIG. 2 is an enlarged sectional view illustrating another example of the multilayer structure of the thermally assisted magnetic recording medium of the present invention.

Thermally assisted magnetic recording mediums having a multilayer structure as illustrated in FIG. 2 were manufactured as follows.

A Ni-50 atomic % Ta alloy seed layer (202) having a thickness of 10 nm was formed on a heat-resistant glass substrate (201). Then a soft magnetic underlayer (203) having a thickness of 50 nm, comprised of Co-28 atomic % Fe-5 atomic % Zr-3 atomic % Ta alloy, was formed on the Ni—Ta alloy seed layer-formed substrate. Then a Ta underlayer (204) having a thickness of 7 nm was formed thereon. Thereafter an underlayer (205) predominantly comprised of MgO and having a thickness of 3 nm was formed, and then the substrate was heated to 450° C. Thereafter (Fe-50 atomic % Pt-10 atomic % Cu)-40 atomic % C magnetic layer (206)

having a thickness of 10 nm and then a carbon protective overcoat (207) having a thickness of 3 nm were formed in this order.

As the underlayer (205) predominantly comprised of MgO, each of the following compositions was adopted.

MgO-18 mol % $SiO_2$ (Example 2-1)
MgO-5 mol % $SiO_2$-5 mol % $Cr_2O_3$ (Example 2-2)
MgO-5 mol % $TiO_2$—$Cr_2O_3$ (Example 2-3)
MgO-4 mol % $TiO_2$-3 atomic % $ZrO_2$ (Example 2-4)
MgO-8 mol % $Cr_2O_5$ (Example 2-5)
MgO-10 mol % $Al_2O_3$-3 atomic % $Ta_2O_5$ (Example 2-6)
MgO-5 mol % $Y_2O_3$ (Example 2-7)
MgO-10 atomic % TiO-2 mol % ZnO (Example 2-8)

For comparison, an underlayer which is predominantly comprised of MgO but to which an oxide had not been added was used in Comparative Example 2.

Further, in order for conducting plane TEM observation of the underlayers (205) predominantly comprised of MgO, test specimens were prepared by the same procedures as in Examples 2-1 to 2-8 wherein the magnetic layer has not been formed on each of the underlayers (205) predominantly comprised of MgO with all other conditions remaining the same.

Plane TEM observation of the underlayer (205) predominantly comprised of MgO conducted on the test specimens revealed that the underlayers (205) predominantly comprised of MgO formed in Examples 2-1 to 2-8 had an average particle diameter in the range of approximately 5 nm to 10 nm. The observation further revealed that the MgO underlayer in Comparative Example 2, to which an oxide had not been added, had an average particle diameter larger than 30 nm.

Plane TEM observation of each magnetic layer of the magnetic recording mediums manufactured in Examples 2-1 to 2-8 and Comparative Example 2 was conducted. The average particle diameter <D> and the particle diameter dispersion, standardized by the average particle diameter, σ/<D> are shown in Table 2. The average particle diameters <D> in magnetic layer of the magnetic recording mediums manufactured in Examples 2-1 to 2-8 were in the range of 5.5 nm to 6.4 nm. The particle diameter dispersions, standardized by the average particle diameter, σ/<D>, in magnetic layer of the magnetic recording mediums manufactured in Examples 2-1 to 2-8 were small, i.e., not larger than 0.22. In contrast, the average particle diameter <D> in magnetic layer of the magnetic recording medium of Comparative Example 2 was approximately the same as those of Examples 2-1 to 2-8, but, the particle diameter dispersions, standardized by the average particle diameter, σ/<D>, in magnetic layer of the magnetic recording medium of Comparative Example 2 was 0.32, i.e., far larger than those of Examples 2-1 to 2-8.

The above mentioned difference in the average particle diameter, σ/<D>, between the magnetic layer of the mediums of the inventive examples and the magnetic layer of the medium of comparative example is presumed that the difference of σ/<D> is due to the fact the crystal grain diameter in the MgO underlayer to which an oxide has not been added is larger than that in the MgO underlayer in the present invention to which an oxide is added.

Thus, it is apparent that the average particle diameter in the magnetic layer can be minimized and the particle size in the magnetic layer can be substantially uniform by forming an underlayer predominantly comprised of MgO and comprising a specific oxide.

TABLE 2

| Examples | Composition of underlayer | <D> (nm) | σ/<D> |
|---|---|---|---|
| Ex. 2-1 | MgO—18 mol % $SiO_2$ | 6.2 | 0.19 |
| Ex. 2-2 | MgO—5 mol % $SiO_2$—5 mol % $Cr_2O_3$ | 6.4 | 0.21 |
| Ex. 2-3 | MgO—5 mol % $TiO_2$—$Cr_2O_3$ | 5.5 | 0.18 |
| Ex. 2-4 | MgO—4 mol % $TiO_2$—3 at. % $ZrO_2$ | 5.8 | 0.22 |
| Ex. 2-5 | MgO—8 mol % $Cr_2O_3$ | 6.2 | 0.22 |
| Ex. 2-6 | MgO—10 mol % $Al_2O_3$—3 at. % $Ta_2O_5$ | 6.0 | 0.21 |
| Ex. 2-7 | MgO—5 mol % $Y_2O_3$ | 5.9 | 0.19 |
| Ex. 2-8 | MgO—10 at. % TiO—2 mol % ZnO | 6.1 | 0.20 |
| Com. Ex. 2 | MgO | 6.2 | 0.32 |

Evaluation of Electromagnetic Conversion Characteristics

Figure 3:
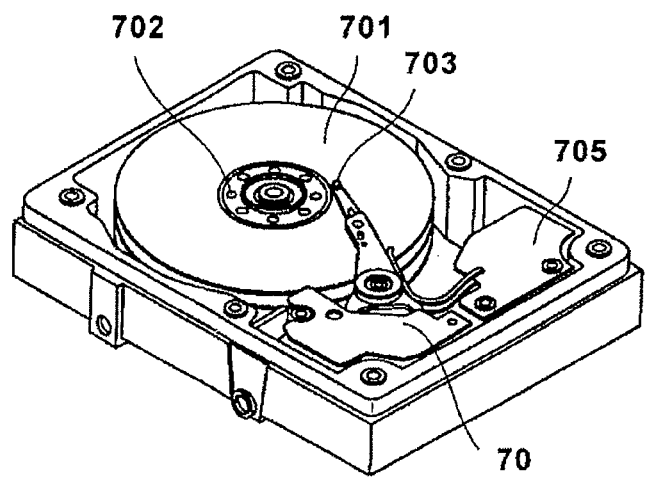
FIG. 3 is a perspective illustration showing an example of the magnetic recording storage device of the present invention.

Each of the thermally assisted magnetic recording mediums manufactured in Examples 2-1 to 2-8 was coated with a perfluoropolyether lubricant. Using each lubricant-coated magnetic recording medium, a magnetic recording storage device having a structure as illustrated in FIG. 3 was manufactured. The magnetic recording storage device had, in combination: a thermally assisted magnetic recording medium (701), a driving part (702) for rotating the thermally assisted magnetic recording medium (701), a magnetic head (703), means (704) for moving the magnetic head, and a recording-and-reproducing signal treating means (705).

Figure 4:
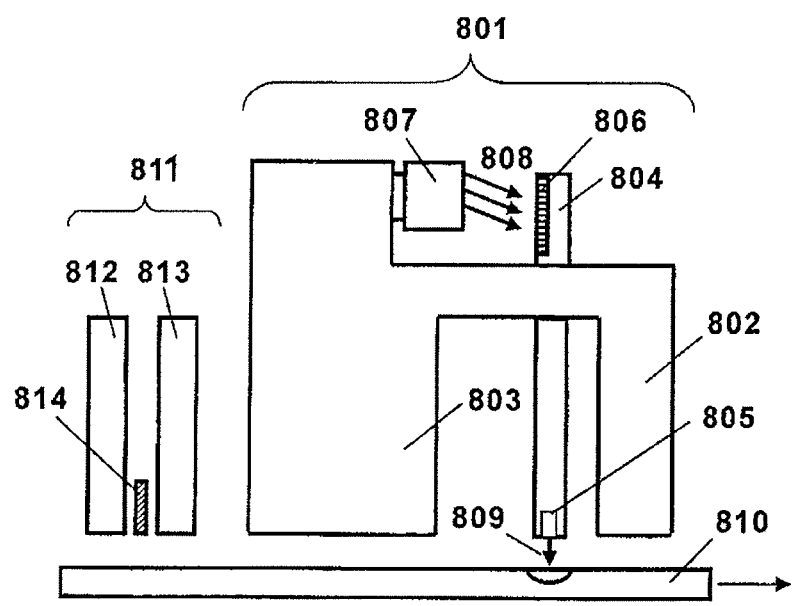
FIG. 4 is an enlarged view of a magnetic head provided in the magnetic recording storage device of the present invention.

The magnetic head (FIG. 3, 703) had a constitution as illustrated in FIG. 4. The magnetic head is comprised of a recording head part (801) and a reproducing head part (811).

The recording head part (801) had an upper magnetic pole (802), a lower magnetic pole (803), and a PSIM (planar solid immersion mirror) (804) sandwiched between the upper pole (802) and the lower pole (803). The PSIM has a structure as described in, for example, Jpn., J. Appl. Phys., Vol. 145, No. 2B, pp 1314-1320 (2006). The PSIM (804) had an evanescent light-emitting means (805) provided at the tip of the PSIM (804). The PSIM (804) constitutes a waveguide for guiding laser from the laser-emitting means (807) to the evanescent light-emitting means (805). The PSIM has a grating part (806) which is irradiated with semi-conductor laser (808) having a wavelength of 650 nm emitted from the laser-emitting means (807).

The laser is concentrated to the evanescent light-emitting means (805), and the emitted evanescent light (809) heats the thermally assisted magnetic recording medium (810). The laser wavelength is preferably chosen so as to be close to the optimum excited wavelength which varies depending upon the material and shape of the evanescent light-emitting means (805).

The reproducing head part (811) of the magnetic head has a upper shield (812), a lower shield (813), and a TMR element (814) sandwiched between the upper shield (812) and the lower shield (813).

Using the above-mentioned magnetic head, each of the magnetic recording mediums manufactured in Examples 2-1 to 2-8 was heated, and recording was made at a linear recording density of 1600 kFCI (kilo Flux Changes per Inch) whereby the electromagnetic conversion characteristics were evaluated. The evaluation results are shown in Table 3. The overwrite property (OW) was measured by writing a signal of 800 kFCI and then overwriting a signal of 107 kFCI, and evaluating the reminder of the signal of 800 kFCI.

High S/N ratios of at least 15.3 dB were obtained on all of the magnetic recording mediums of the invention. In contrast, the magnetic recording medium manufactured in Comparative Example 2 using the MgO underlayer not containing an oxide exhibited a greatly lowered S/N ratio and overwrite characteristics as compared with those of the magnetic recording mediums of the invention. The lowered SN ratio and overwrite characteristics of the medium of comparative example are presumed to be due to the fact that the particle diameter dispersion of magnetic crystal grains is large.

Thus, it will be seen that a thermally assisted magnetic recording medium having a high S/N ratio and good overwrite characteristics can be obtained by providing the medium with a MgO underlayer having a specific oxide incorporated therein.

TABLE 3

| Examples | Composition of underlayer | S/N ratio (dB) | OW (dB) |
|---|---|---|---|
| Ex. 2-1 | MgO—18 mol % $SiO_2$ | 16.3 | 34.2 |
| Ex. 2-2 | MgO—5 mol % $SiO_2$—5 mol % $Cr_2O_3$ | 15.3 | 30.6 |
| Ex. 2-3 | MgO—5 mol % $TiO_2$—$Cr_2O_3$ | 18.0 | 35.0 |
| Ex. 2-4 | MgO—4 mol % $TiO_2$—3 at. % $ZrO_2$ | 17.6 | 30.1 |
| Ex. 2-5 | MgO—8 mol % $Cr_2O_3$ | 16.6 | 30.4 |
| Ex. 2-6 | MgO—10 mol % $Al_2O_3$—3 at. % $Ta_2O_5$ | 16.7 | 30.3 |
| Ex. 2-7 | MgO—5 mol % $Y_2O_3$ | 16.8 | 34.2 |
| Ex. 2-8 | MgO—10 at. % TiO—2 mol % ZnO | 16.7 | 32.5 |
| Com. Ex. 2 | MgO | 13.2 | 26.3 |

INDUSTRIAL APPLICABILITY

The thermally assisted magnetic recording medium of the present invention has a magnetic layer characterized as being comprised of fine magnetic crystal grains with a minimized diameter dispersion, exhibiting a sufficiently weak exchange coupling between magnetic grains, and having a minimized coercive force dispersion. Therefore, a magnetic recording storage device provided with the thermally assisted magnetic recording medium having the above-mentioned benefits exhibits improved magnetic recording properties, especially a high SN ratio and good overwriting characteristics. Thus, the magnetic recording storage device is expected to be widely used as magnetic recording system providing a high density recording.

The invention claimed is:

1. A thermally assisted magnetic recording medium comprising a substrate, a plurality of underlayers formed on the substrate, and a magnetic layer which is formed on the underlayers, is (001)-orientated and predominantly comprised of an alloy having a $L1_0$ structure, wherein at least one of said underlayers is predominantly comprised of MgO and comprises at least one oxide selected from the group consisting of $SiO_2$, $TiO_2$, $Cr_2O_3$, $Al_2O_3$, $Ta_2O_5$, $ZrO_2$, $Y_2O_3$, $CeO_2$, MnO, TiO and ZnO, and the underlayer predominantly comprised of MgO and at least one oxide contacts with the magnetic layer and is (100)-orientated to orient the magnetic layer.

2. The thermally assisted magnetic recording medium according to claim 1, wherein a content of the at least one oxide contained in the underlayer predominantly comprised of MgO is in the range of 2 mol to 40 mol %, based on the underlayer predominantly comprised of MgO.

3. The thermally assisted magnetic recording medium according to claim 1, wherein the underlayer predominantly comprised of MgO is formed on an underlayer which is comprised of Cr, or a Cr alloy predominantly comprised of Cr and having a BCC structure.

4. The thermally assisted magnetic recording medium according to claim 1, wherein the underlayer predominantly comprised of MgO is formed on an underlayer comprised of Ta.

5. The thermally assisted magnetic recording medium according to claim 1, wherein the underlayer predominantly comprised of MgO has an average particle diameter of not larger than 10 nm.

6. The thermally assisted magnetic recording medium according to claim 1, wherein the magnetic layer is predominantly comprised of a FePt or CoPt alloy having a $L1_0$ structure, and comprises at least one oxide or element, selected from the group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO and carbon.

7. The thermally assisted magnetic recording medium according to claim 6, wherein a content of said at least one oxide in the magnetic layer is in the range of 10 mol % to 40 mol %, based on the magnetic layer.

8. The thermally assisted magnetic recording medium according to claim 6, wherein a content of carbon in the magnetic layer is in the range of 10 atomic % to 70 atomic %, based on the magnetic layer.

9. A magnetic recording storage device comprising, in combination:
a magnetic recording medium;
a driving part for rotating the magnetic recording medium;
a magnetic head comprising a laser emitting means for heating the magnetic recording medium, a waveguide for guiding laser from the laser-emitting means to a tip of the magnetic head, and an evanescent light-emitting means provided at the tip of the magnetic head part;
means for moving the magnetic head; and
a recording-and-reproducing signal treating means;
wherein the magnetic recording medium is characterized as being a thermally assisted magnetic recording medium as claimed in claim 1.

10. The thermally assisted magnetic recording medium according to claim 1, wherein a content of the at least one oxide contained in the underlayer predominantly comprised of MgO is in the range of 2 mol to 20 mol %, based on the underlayer predominantly comprised of MgO.

* * * * *